(12) United States Patent
Heinrichs

(10) Patent No.: US 10,552,174 B2
(45) Date of Patent: Feb. 4, 2020

(54) COMPUTER SYSTEM, ARRANGEMENT WITH A COMPUTER SYSTEM AND AN EXTERNAL MANAGEMENT DEVICE, AS WELL AS THE USE OF A STORAGE UNIT IN A COMPUTER SYSTEM

(71) Applicant: Fujitsu Limited, Kawasaki-shi, Kanagawa (JP)

(72) Inventor: Hans-Jürgen Heinrichs, Altenbeken (DE)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 15/265,946

(22) Filed: Sep. 15, 2016

(65) Prior Publication Data

US 2017/0083239 A1    Mar. 23, 2017

(30) Foreign Application Priority Data

Sep. 17, 2015 (DE) ........................ 10 2015 115 727

(51) Int. Cl.
*G06F 13/40* (2006.01)
*G06F 9/445* (2018.01)
*G06F 13/20* (2006.01)

(52) U.S. Cl.
CPC .......... *G06F 9/44505* (2013.01); *G06F 13/20* (2013.01); *G06F 13/4022* (2013.01); *G06F 2212/2146* (2013.01)

(58) Field of Classification Search
CPC ................................................. G06F 9/44505
See application file for complete search history.

(56) References Cited

U.S. PATENT DOCUMENTS

2006/0224801 A1   10/2006 Chiu et al.
2008/0276082 A1   11/2008 Culley et al.
(Continued)

FOREIGN PATENT DOCUMENTS

DE   102011118058    5/2013
EP   2 254 051 A1   11/2010

OTHER PUBLICATIONS

GBSR—Combined Search and Examination Report dated Mar. 15, 2017 for Great Britain Application No. GB1615656.4.
(Continued)

*Primary Examiner* — Reginald G Bragdon
*Assistant Examiner* — Edward Wang
(74) *Attorney, Agent, or Firm* — Fujitsu Patent Center

(57) ABSTRACT

A computer system assembly has a computer system and an external management device, as well as use of a storage unit in a computer system. Included in the computer system, is an energy supply device; as well as a management unit, which controls and/or manages system parameters based upon system parameter data; and, at least one separate interface for connecting an external management device (smartphone, tablet PC or a notebook, for example). The computer system also has at least one storage unit, which is connected to a management unit for the internal exchange of system parameter data. The at least one storage unit is connected to the at least one separate interface for the external exchange of system parameter data and is operable externally by the separate interface(s) independent from the energy supply device.

9 Claims, 3 Drawing Sheets

(56) References Cited

U.S. PATENT DOCUMENTS

| | | | |
|---|---|---|---|
| 2009/0119445 A1* | 5/2009 | Kolvick | G06F 8/61 |
| | | | 711/103 |
| 2009/0158081 A1 | 6/2009 | Dake et al. | |
| 2015/0032925 A1 | 1/2015 | Chidester et al. | |
| 2015/0058506 A1 | 2/2015 | Muhsam | |

OTHER PUBLICATIONS

GBSR—Examination Report dated Jan. 16, 2019 for GB Patent Application No. GB1615656.4.

* cited by examiner

COMPUTER SYSTEM, ARRANGEMENT WITH A COMPUTER SYSTEM AND AN EXTERNAL MANAGEMENT DEVICE, AS WELL AS THE USE OF A STORAGE UNIT IN A COMPUTER SYSTEM

CROSS-REFERENCE TO RELATED APPLICATIONS

This application claims the benefit of priority from German Patent Application No. 102015115727.6 filed on Sep. 17, 2015, which is herein incorporated by reference in its entirety.

BACKGROUND

1. Field

The invention relates to a computer system, comprising an energy supply device, a management unit for controlling and/or managing system parameters based upon system parameter data as well as at least one separate interface for connection of an external management device.

2. Description of Related Art

Such a computer system can be administered via an external management device, wherein the external management device can access the management unit via the interface in order to deposit system parameter data in the management unit, to manage, configure or read out system parameter data from the management unit. For example, such system parameter data may comprise a geographical position (location data or data via the installation position) of the computer system, pre-settings of an IP address or of BIOS parameters (BIOS=Basic Input Output system), MAC address information, component information, information about the energy supply, error information, event protocol data or the like.

The disadvantage of such a conventional management solution in a computer system is that the management unit can only be accessed by an external management device if the computer system is in a switched-on state, i.e. if at least the management unit per se is supplied with electric energy via the energy supply device. However, in the case where the computer system is completely without power, in which the management unit is without an electric energy supply, the management unit cannot be accessed. A control and/or administration of system parameters based upon system parameter data of the described manner is therefore not possible. This complicates administration or restricts said administration to certain operating situations of the computer system.

SUMMARY

It is to be understood that both the foregoing summary description and the following detailed description are explanatory as to some embodiments of the present invention, and not restrictive of the present invention as claimed.

One object of the invention is to design administration of a computer system in a more simple or comfortable manner by means of the above-mentioned components.

The object is achieved by a computer system of the above-mentioned type in that the computer system comprises at least one storage unit for storing system parameter data, wherein the at least one storage unit is connected to the management unit for the internal exchange of system parameter data, and wherein the at least one storage unit is connected to the at least one separate interface for the external exchange of system parameter data, and wherein the at least one storage unit can be externally operated independently from the energy supply device by means of the at least one separate interface.

Such a developed computer system provides a simple and cost-efficient solution for the administration of the computer system, even if said computer system with the internal components thereof, in particular the management unit, is in a state without energy. The at least one storage unit is designed as a separate and additional storage unit in the computer system and switched between the management unit and the separate interface for connection of an external management device. This way the storage unit fulfills a specific functionality and acts as some kind of "mailbox" between the management unit and an external management device. In a switched-on state of the computer system, the management unit can access the storage unit and store system parameter data there. However, in a switched-off state of the computer system, i.e. a state without energy, for example, if the computer system is separated from an energy source via the energy supply device of said computer system, an external management device may access the at least one storage unit via the separate interface in order to deposit the system parameter data, to manage, to configure or read out said system parameter data form the storage unit. In this case, the at least storage unit is operated independently from the energy supply device by means of the at least one separate interface by means of the external management device, in particular supplied with electric energy for the operation thereof.

The general advantage of the combination of the additional storage unit and separate interface for connection of an external management device is that system parameter data can be exchanged between the computer system and an external management device by means of the storage unit and be buffered in said storage unit, wherein this can be performed independently from the energy supply of the computer system, specifically the internal components thereof, via the energy supply device. For example, this way the system parameter data can be deposited at a predetermined location in the storage unit through the installation of the computer system and are available to the management unit as soon as the computer system is supplied with electric energy via the energy supply device, for example when turning the system on for the first time.

For example, an external management device may store BIOS settings in the storage unit via the interface, with the storage unit being operated via the external management device. Once the computer system is turned on and supplied with electric energy, the BIOS settings can be transmitted from the storage unit to the management unit so that the BIOS of the computer system can be configured and managed based upon the transmitted data. In contrast, certain system parameter data such as event protocol data or error states can be stored in the storage unit by the management unit before the computer system is turned-off and transitions into a state without energy. In this state, an external management unit may nevertheless access the storage unit via the interface and read out the corresponding data, for example for the purpose of analysis. Thus, the storage unit is an intermediary between management unit and separate interface or external management device, respectively, which is connected to the separate interface.

The computer system may be a server, in particular a blade server, for example. The management unit may be a so-called "baseboard management controller" (BMC), in particular a so-called iRMC (Integrated Remote Management Controller). It is conceivable to set-up only one separate interface or also to provide two or more interfaces, via which an external management device can be connected to the at least one storage unit. In the case of multiple interfaces, it is conceivable to provide a switch unit (e.g. a multiplexing device) which connects the storage unit to the suitable interface depending on the connection type or the connection standard of an external management device with regard to the respective interface.

The storage unit is a separate and additional storage component (storage module) in the computer system, which in particular is different from the conventional storage media in the computer system such as hard disk drives, storage drives, working memory, graphics memory, BIOS memory and so on. Advantageously, the storage unit is exclusively set up for the realization of the above-mentioned functionalities and switched between the management unit and the separate interface(s) in a communication flow. For example, the storage unit may be a non-volatile storage component, e.g. an EEPROM component (EEPROM=Electrically Erasable Programmable Read-Only Memory) or may be a flash memory. Advantageously, the storage unit can be programmed, i.e. written, both via an external management device by means of the at least one separate interface and via the management unit by means of an internal communication bus. Furthermore, both the external management device and the management unit may have a read-access to the storage unit in the computer system. However, it is also conceivable to provide other application cases in which the storage unit can only be written by the management unit or by an external management device, wherein the other component only has a read-access to the storage unit. This may be advantageous or appropriate depending on the security considerations.

In one embodiment of the computer system, the at least one separate interface is advantageously set up for the bidirectional exchange of system parameter data between the at least one storage unit and an external management device. That means that the external management device may access the storage unit both in a reading and writing manner with respect to the system parameter data.

In one embodiment of the computer system, an insulator component is switched between the storage unit and the management unit for insulating of a first communication bus on the side of the management unit from a second communication bus on the side of the at least one storage unit. The insulator component may be a commercially available component for the separation and/or translation of bus signals of a first communication bus into bus signals of a second communication bus. For example, it is conceivable to translate bus signals of a system management bus as a first communication bus on the side of the management unit into bus signals of an I2C bus as a second communication bus on the side of the at least one storage unit and, on the other hand, to insulate the two bus standards electrically from one another in such a way that a trouble-free operation of both bus standards can be effected. The use of an insulator component makes sense in particular if communications busses of different transmission standards having different transmission characteristics are used, such as different transmission frequencies, address length, bit sequences, slew rate, and so forth.

According to one embodiment, the computer system comprises both a first and a second interface as well as a first and a second storage unit, wherein the first storage unit is connected to the first interface and wherein the second storage unit is connected to the second interface. In this case, the two storage units may have similar or different structure. It is also conceivable that one or both of the storage units is/are integrated with the first or second interface in each case in an electronic component or all interfaces and all storage units are integrated in one common module.

An external management device can be connected to the computer system both via the first and via the second interface and accesses the first or second storage unit. Advantageously, in this embodiment, a switch device is set up in the direction toward the management unit so that the latter can access both the first and the second storage unit in a reading and/or writing manner. Just as well, the switch device may be designed as a multiplexing device, for example.

In one embodiment of the computer system, the at least one storage unit can be operated via the energy supply device when the computer system is in a switched-on state. The switched-on state in this context is defined in that the computer system is supplied with electric energy and has certain, even though minimal, energy consumption. The switched-on state differs from the not switched-on state in that in the latter case, the computer system is entirely without an energy supply. However, if the computer system is supplied with electric energy via the energy supply device of said system, the storage unit may also be operated via the energy supply device. It is conceivable to prioritize an operation of the storage unit via the energy supply device over a supply of the storage unit by means of an external management device connected to the separate interface. However, the reverse case may be applied as well.

Advantageously, the computer system can be applied in an arrangement with the same and an external management device, which is connected to the at least one separate interface of the computer system for the exchange of system parameter data with the at least one storage unit and which supplies electric energy to the at least one storage unit via the at least one separate interface for the operation of said unit. The external management device may be a smartphone, a tablet PC or a notebook, for example.

The above object is further achieved by the use of at least one storage unit in a computer system in such a way that the at least one storage unit is switched to the a management unit of the computer system for the internal exchange of system parameter data, and that the at least one storage unit is connected to at least one separate interface of the computer system for the external exchange of system parameter data, wherein the at least one storage unit can be externally operated independently by an energy supply device of the computer system by means of the at least one separate interface. This specific use of a storage unit is provided so that the storage unit is set up in a type of "mailbox" or intermediary between the management unit and a separate interface of the computer system. An external management device may be connected to the computer system via the separate interface. Due to the fact that the storage unit is used independently from the energy supply device of the computer system, the storage unit can be externally operated by means of the at least one separate interface. This way an exchange of system parameter data with an external management device is possible even if the computer system is not supplied with electric energy via its energy supply device.

Other advantageous aspects are disclosed in the subclaims. The invention will subsequently be explained in greater detail with reference to various embodiments in conjunction with multiple drawings.

BRIEF DESCRIPTION OF THE DRAWINGS

Embodiments are illustrated by way of example and not limited by the following figures.

DETAILED DESCRIPTION OF EXAMPLES OF EMBODIMENTS

Figure 1:
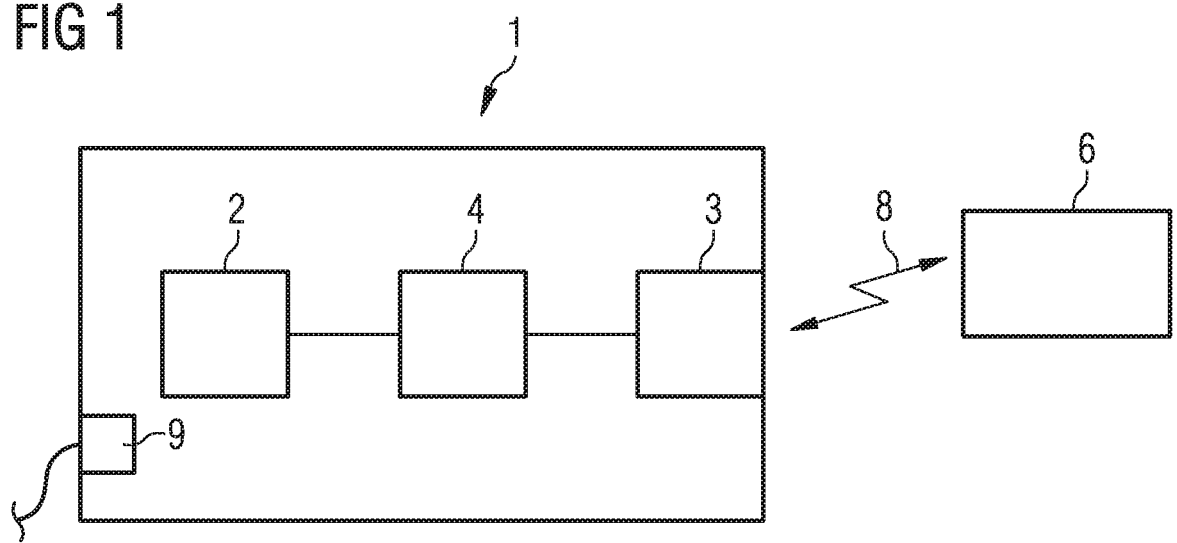
FIG. 1 is a schematic illustration of a general arrangement with a computer system and an external management device.

FIG. 1 shows a schematic illustration of a general arrangement, comprising a computer system 1 and an external management device 6. The computer system 1 comprises an energy supply device 9, which according to FIG. 1 represents a power supply connection for connecting the computer system 1 to the energy supply network, for example. However, it is also conceivable that the energy supply device 9 includes a battery for operating the computer system 1, which battery may be charged with electric energy via an external power supply connection. Even a combination of such components is conceivable. Furthermore, the computer system 1 comprises, besides conventional functionally predetermined components (main board, processor core, working memory, long term storage, expansion cards, etc.) which will not be explained in greater detail, a management unit 2 for controlling and/or managing system parameter data of computer system 1 based upon system parameter data. The management unit 2 is a so-called Baseboard Management Controller (BMC), for example.

Furthermore, the computer system 1 comprises an interface 3 for connection of the external management device 6 via an external communication device 8. For example, the interface 3 may be a USB or NFC communication interface (NFC=Near Field Communication). Accordingly, the external communication connection 8 may be a wired communication and/or a radio communication.

A separate storage unit 4 is switched between the management unit 2 and the interface 3. This storage unit 4 forms the core of the subsequently explained functionalities. The storage unit 4 has a dual access option. This means that both the management unit 2 can internally access the storage unit 4 and additionally the external management device 6 can externally access the storage unit 4 via the interface 3. Furthermore, the storage unit 4 is independently operable by the energy supply device 9 of the computer system 1 by means of the interface 3. This means that management device 6 connected to the computer system 1 via the interface 3 may supply electric energy to the storage unit 4 in order to operate the storage unit 4. For example, the storage unit 4 may comprise an EEPROM component and/or a flash memory. Furthermore, the storage unit 4 is advantageously set up in such a way that both the management unit 2 and the external management device 6 can access the storage unit 4 in both a reading and writing manner in order to deposit system parameter data therein or to read-out system parameter data from the storage unit 4.

Such a structure of the computer system 1 provides the advantage that the external management device can access system parameter data in the storage unit 4 even if the management unit 2 is not supplied with power or energy and is in a not switched-on state or a not active state due to a lack of electric energy via the energy supply device 9. For example, this is the case if the computer system 1 is mechanically installed at a place of operation without being turned on. Furthermore, the management unit 2 may deposit system parameter date in the storage unit 4 during operation of the computer system 1, whereupon the computer system 1 is shut down and turned-off. Subsequently, an external management device 6 may nevertheless supply the storage unit 4 with energy via the interface 3 and read out the stored system parameter data from the storage unit 4.

For example, the computer system 1 is a server, specifically a blade server.

With respect to the functionality of the computer system 1 in cooperation with the external management device 6, multiple application options are conceivable.

In one possible use or application, for example a geographical position (local position data) of the computer system 1 (e.g. rack position in a data center or chassis position in a rack or installation position in a chassis) can be programmed into the storage unit 4 by means of the external management device 6, wherein the external management device 6 deposits such system parameter data in the storage unit 4 via the communication connection 8 and the interface 3. This may be effected through the installation of the computer system 1 at its installation position without that the computer system 1 needs to be supplied with electric energy. The system parameter data are written into the storage unit 4, wherein the storage unit 4 is operated with electric energy via the external management unit 6 by means of the interface 3. Interaction with the management unit 2 is not required for such actions.

Not before turning on the computer system 1, i.e. supplying the energy supply device 9 with electric energy so that even the management unit 2 is supplied with electric energy, said unit may read out and further process the system parameter data deposited in the storage unit 4 from the storage unit 4 via the geographical position of the computer system 1. For example, such data may be detected via a firmware of the computer system 1 or deposited in a BIOS.

In another application case, the management unit 2 may write predetermined network settings of the computer system 1 during operation of the computer system 1 into the storage unit 4, wherein the computer system 1 is subsequently shut-down and transitions into a state without energy. The management unit 2 is then not supplied with electric energy and can no longer be addressed. However, the system parameter data are stored in the storage unit 4 via the network settings so that the external management device 6 can establish a communication connection 8 to the interface 3 and reads out the respective deposited data from the storage unit 4.

Further application options in this context provide the deposition of so-called FRU information (FRU=Field Replaceable Unit), mainboard series numbers, MAC addresses of the ethernet controller, status of the error message devices, system event protocol files, BIOS and BMC or iRMC versions, chassis ID information, and so on.

Figure 2:
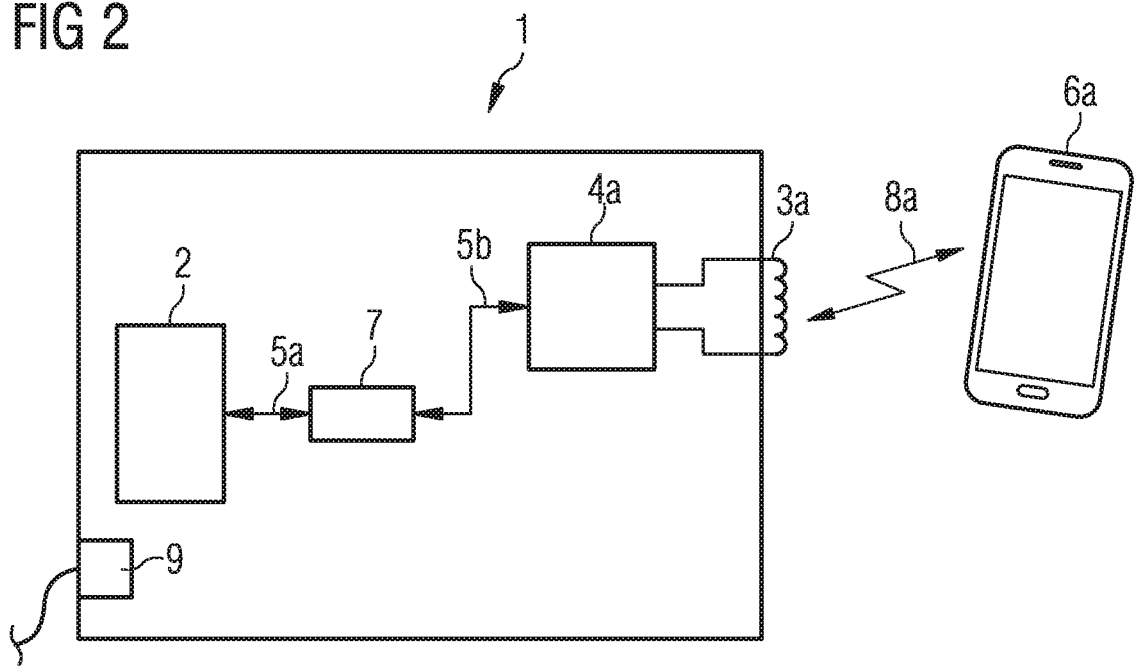
FIG. 2 is an illustration of a first embodiment of a computer system in arrangement with a specific external management device.

FIG. 2 shows a specific first embodiment of a computer system 1, which according to FIG. 2 comprises a management unit 2 of the above described type as well as an interface 3a and a storage unit 4a. As described in FIG. 1, the computer system 1 is supplied with electric energy via an energy supply device 9 according to FIG. 2 as well.

In the embodiment according to FIG. 2, the interface 3a is an NFC interface for near field communication. The interface 3a specifically comprises a sending/receiving antenna for establishing a wireless communication connection 8a to an external management device 6a, which according to FIG. 2 is a smartphone. If said smartphone 6a is brought into the vicinity of the interface 3a, the smartphone 6a and the computer system 1 may exchange data via the interface 3a. Advantageously, this is effected in a bidirectional manner. This way, system parameter data may be stored in the storage unit 4a, which is connected to the interface 3a, or be read out from there.

Internally, the storage unit 4a is connected to the management unit 2 via a first communication bus 5a and a second communication bus 5b. The first communication bus 5a is separated from the second communication bus 5a via an insulator component 7. For example, the first communication bus 5a is a system management bus (SM bus), while the second communication bus 5b is an I²C bus. By means of the insulator component 7, which may be a commercially available insulator for insulation or translation between two bus standards, the first and second communication busses 5a and 5b may be insulated from one another and nevertheless a data communication of the first bus standard is translated into a data communication of the second bus standard. This way, a connection of different communication standards in the computer system 1 is possible in a simple manner without having to design the individual components in a specific manner or adapt them to one another. This way, standard components with predetermined communication standards may be applied for both the storage unit 4a and the interface 3a and for the management unit 2. For further functionality of the embodiment according to FIG. 2, reference is made to the explanations on FIG. 1.

Figure 3:
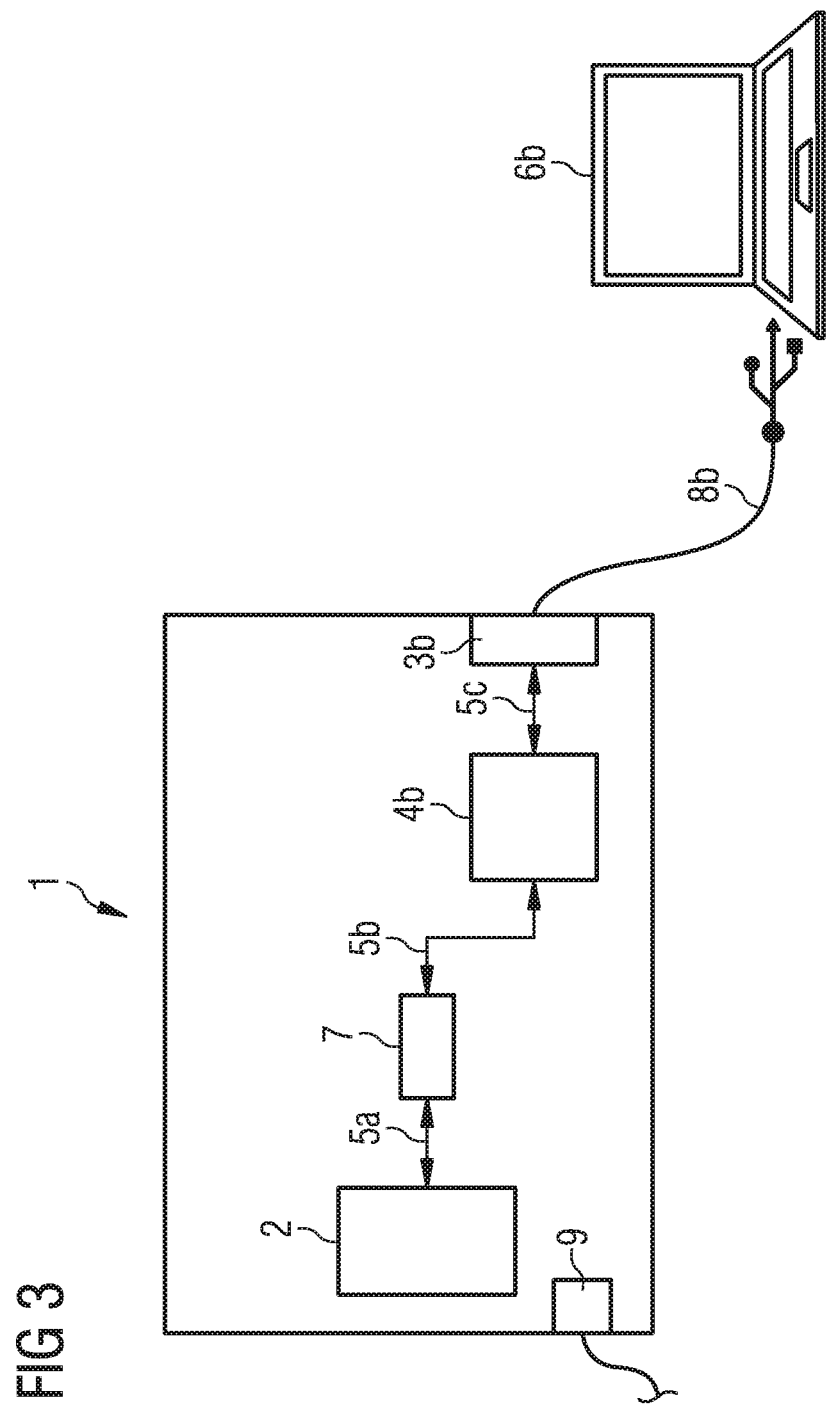
FIG. 3 is an illustration of a second embodiment of a computer system in arrangement with a specific second management device.

FIG. 3 shows a second embodiment of a computer system 1 which essentially comprises the components of the above-described type. In contrast to the embodiment according to FIG. 2, the computer system 1 according to FIG. 3 has a different interface 3b, which in this example is designed as a USB interface. An external management device 6b, which is a notebook in FIG. 3 by way of example, can be connected to the interface 3b via a cabled USB communication connection 8b. Furthermore, the computer system 1 according to FIG. 3 comprises a storage unit 4b, which is connected to the interface 3b via a third communication bus 5c, which is a USB bus by way of example. Further, the computer system 1 comprises components as have been explained already in conjunction with FIG. 2.

Figure 4:
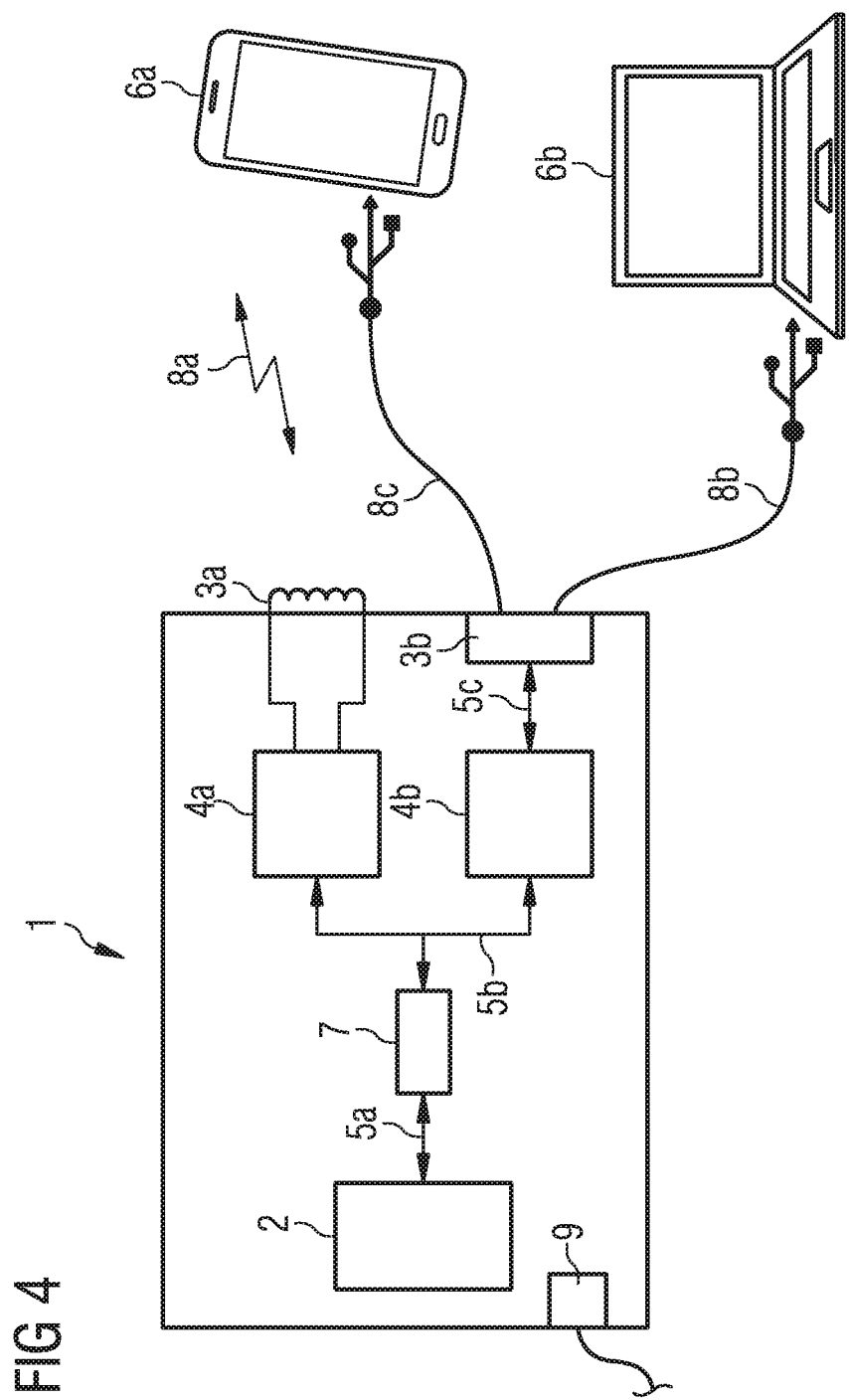
FIG. 4 is an illustration of a third embodiment of a computer system in arrangement with two possible external management devices.

FIG. 4 shows a third embodiment of a computer system 1, which practically shows a combination of embodiments according to FIGS. 2 and 3.

In particular, the computer system 1 comprises two interfaces 3a and 3b as well as two storage units 4a and 4b, which in each case are assigned to the interfaces 3a and 3b, respectively. As in FIG. 2, the interface 3a is an NFC communication interface and interface 3b is a USB interface, as explained in FIG. 3.

For example, the external management device 6a, which is a smartphone analogous to FIG. 2, can access the storage unit 4a via an external communication connection 8a. Via the interface 3b, both the external management device 6a and the external management device 6b, which is a notebook analogous to FIG. 3, can access the storage unit 4b via the respective USB communication connection 8b and 8c, respectively. This way, the external management devices 6a and 6b may access the system parameter data deposited in the storage units 4a and 4b, respectively, or deposit corresponding data in said units. For the rest, the structure of computer system 1 essentially corresponds to the components that have been explained with reference to FIGS. 2 and 3. However, there is a need for logics in the computer system 1 according to FIG. 4 so that the management unit 2 can access both the storage unit 4a and the storage unit 4b via the communication bus 5a, the insulator component 7 as well as the communication bus 5b. For example, a multiplying device may be used to that end (which is not shown), which forwards commands of the management unit 2 either to the storage unit 4a or to the storage unit 4b or to both via the communication bus 5b. In the reverse communication direction, from the storage unit 4a or storage unit 4b, respectively, in the direction of the management unit 2, a respective multiplexing device may forward signals in a logical manner just as well.

The invention of the type described herein comes with the advantage that the exchange of system parameter data between an external management device and the computer system can be performed in a very cost-efficient manner with very little hardware even if the computer system is in a state in which it is not supplied with electric energy so that the management unit in the computer system is not addressable. The storage unit which is set up separately and, in particular, in the computer system for the realization of the described functionality and which is switched between the management unit and an interface for the connection of an external management device, acts as an intermediary or "mailbox" between the individual components. By means of the interface, the storage unit can be externally operated independently from an energy supply of the computer system so that data can be deposited in the storage unit or be read out from said unit. When the computer system is supplied with electric energy, the data deposited in the management unit can also be read out and processed by the management unit and other data can be deposited in the storage unit.

The illustrated embodiments are merely exemplary.

Examples of embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made therein without departing from the spirit and scope of the present invention as set forth in the claims.

The invention claimed is:

1. A computer system, comprising:
   an energy supply device;
   a management unit for controlling and/or managing system parameters based upon system parameter data;
   at least one separate interface for connecting an external management device; and
   at least one storage unit for storing the system parameter data,
   wherein the at least one storage unit is connected to the management unit for an internal exchange of the system parameter data, and
   wherein the at least one storage unit is connected to the at least one separate interface for an external exchange of the system parameter data,
   wherein the storage unit is switched between the management unit and the at least one separate interface in a communication flow and the at least one storage unit has a dual access option such that both the management unit can internally access the at least one storage unit and additionally an external management device can externally access the at least one storage unit via the at least one separate interface when the at least one storage unit is supplied with electric enemy by the enemy supply device, and wherein the at least one storage unit can be operated externally by means of the at least one separate interface independent from the energy supply device such that an external management device can supply electric energy to the at least one storage unit and can externally access the at least one storage unit via the at least one separate interface, even when the computer system is not supplied with the electric energy via the energy supply device.

2. The computer system according to claim 1, wherein the at least one separate interface is arranged for bidirectional exchange of system parameter data between the at least one storage unit and the external management device.

3. The computer system according to claim 1, wherein an isolator component is switched between the at least one storage unit and the management unit for isolation of a first communication bus on a side of the management unit from a second communication bus on a side of the at least one storage unit.

4. The computer system according to claim 1, wherein the at least one separate interface includes a first and a second interface and wherein the at least one storage unit includes a first and a second storage unit, wherein the first storage unit is connected to the first interface and wherein the second storage unit is connected to the second interface.

5. The computer system according to claim 1, wherein the at least one interface comprises a USB interface and/or an NFC interface.

6. An assembly having a computer system according to claim 1 and the external management device, which is connected to the at least one separate interface of the computer system for the exchange of the system parameter data with the at least one storage unit and which supplies electric energy to the at least one storage unit for the operation thereof via the at least one separate interface.

7. The assembly according to claim 6, wherein the external management device is a smartphone, a tablet PC or a notebook.

8. A method of using at least one storage unit in a computer system, the method comprising:
connecting the at least one storage unit to a management unit of the computer system for an internal exchange of system parameter data;
connecting the at least one storage unit to at least one separate interface of the computer system for an external exchange of the system parameter data; and
switching connection of the at least one storage unit between the management unit and the at least one separate interface in a communication flow and the at least one storage unit has a dual access option such that both the management unit can internally access the at least one storage unit and additionally an external management device can externally access the at least one storage unit via the at least one separate interface when the at least one storage unit is supplied with electric enemy by an energy supply device,
wherein the at least one storage unit is operated externally by means of the at least one separate interface independent from the energy supply device of the computer system such that an external management device can supply electric enemy to the at least one storage unit and can externally access the at least one storage unit via the at least one separate interface, even when the computer system is not supplied with the electric enemy via the energy supply device.

9. The method according to claim 8, wherein the at least one separate interface of the computer system is used as USB interface and/or NFC interface.

* * * * *